United States Patent
Russek et al.

(10) Patent No.: US 12,018,774 B2
(45) Date of Patent: Jun. 25, 2024

(54) STEAM HOSE WITH INTERNAL LINER FOR CHEMICAL CLEANING

(71) Applicant: Refined Technologies, Inc., Spring, TX (US)

(72) Inventors: Michael J. Russek, Corpus Christi, TX (US); Sean E. Sears, Spring, TX (US)

(73) Assignee: Refined Technologies, Inc., Spring, TX (US)

( * ) Notice: Subject to any disclaimer, the term of this patent is extended or adjusted under 35 U.S.C. 154(b) by 0 days.

(21) Appl. No.: 17/784,005

(22) PCT Filed: Dec. 16, 2020

(86) PCT No.: PCT/US2020/065345
§ 371 (c)(1),
(2) Date: Jun. 9, 2022

(87) PCT Pub. No.: WO2021/127002
PCT Pub. Date: Jun. 24, 2021

(65) Prior Publication Data
US 2023/0026224 A1 Jan. 26, 2023

Related U.S. Application Data

(60) Provisional application No. 62/948,636, filed on Dec. 16, 2019.

(51) Int. Cl.
*F16L 11/02* (2006.01)
*B08B 9/032* (2006.01)
(Continued)

(52) U.S. Cl.
CPC ............ *F16L 11/02* (2013.01); *B08B 9/0327* (2013.01); *B08B 9/08* (2013.01); *F16L 11/15* (2013.01);
(Continued)

(58) Field of Classification Search
CPC ......... F16L 11/02; F16L 11/15; B08B 9/0327; B08B 9/08; B08B 2209/032; B08B 2209/08; B08B 2230/01
See application file for complete search history.

(56) References Cited

U.S. PATENT DOCUMENTS 4,854,416 A * 8/1989 Lalikos ................. F16L 27/111
138/131
4,890,363 A 1/1990 Cross
(Continued)

FOREIGN PATENT DOCUMENTS

| WO | 2006002459 A1 | 1/2006 |
|----|---------------|--------|
| WO | 2007019551 A2 | 2/2007 |
| WO | 2010003174 A1 | 1/2010 |

OTHER PUBLICATIONS

International Search Report and Written Opinion issued in counterpart International PCT Application No. PCT/2020/065345, dated Mar. 9, 2021.

(Continued)

*Primary Examiner* — Sharidan Carrillo
(74) *Attorney, Agent, or Firm* — Blank Rome LLP

(57) ABSTRACT

A hose conducts high-temperature steam combined with cleaning solution in a cleaning operation. The hose comprises an external liner, an intermediate conduit, and an internal liner. The external liner comprises first braiding and is disposed along a longitudinal length of the hose. The intermediate conduit is disposed in the external liner along the longitudinal length of the hose. The intermediate conduit has a plurality of corrugations disposed laterally in the tubular wall of the intermediate conduit. The internal liner comprises second braiding and is disposed in the intermediate conduit along the longitudinal length of the hose. The internal liner provided a full bore for the hose configured to (Continued)

conduct the high temperature steam combined with the cleaning solution in a volatilized mixture.

17 Claims, 3 Drawing Sheets

(51) Int. Cl.
 B08B 9/08 (2006.01)
 F16L 11/15 (2006.01)
(52) U.S. Cl.
 CPC ..... *B08B 2209/032* (2013.01); *B08B 2209/08* (2013.01); *B08B 2230/01* (2013.01)

(56) References Cited

U.S. PATENT DOCUMENTS

| | | | |
|---|---|---|---|
| 5,297,586 A * | 3/1994 | McIntosh | F16L 33/26 138/121 |
| 5,638,869 A * | 6/1997 | Zaborszki | F16L 33/00 228/136 |
| 5,899,236 A | 5/1999 | Coronado et al. | |
| 5,908,090 A | 6/1999 | Fouts | |
| 6,062,268 A | 5/2000 | Elsasser et al. | |
| 7,837,962 B2 | 11/2010 | Eiteneer et al. | |
| 2005/0211274 A1* | 9/2005 | Jansen | B08B 9/00 134/26 |
| 2006/0169305 A1 | 8/2006 | Jansen et al. | |
| 2011/0000572 A1* | 1/2011 | Ramaswamy | B32B 1/08 138/109 |
| 2012/0056414 A1* | 3/2012 | Thomas | F16L 59/153 285/49 |
| 2015/0211309 A1 | 7/2015 | Davis et al. | |
| 2018/0224036 A1* | 8/2018 | Ramaswamy | F16L 33/003 |

OTHER PUBLICATIONS

International Preliminary Report on Patentability issued in counterpart International PCT Application No. PCT/2020/065345, dated Dec. 20, 2021.

* cited by examiner

STEAM HOSE WITH INTERNAL LINER FOR CHEMICAL CLEANING

CROSS-REFERENCE TO RELATED APPLICATION

This application claims the benefit of U.S. Provisional Appl. 62/948,636 filed 16 Dec. 2019, which is incorporated herein by reference in its entirety.

FIELD OF THE DISCLOSURE

The subject matter of the present disclosure is directed to a lined hose or a conduit for chemical cleaning applications, such as for cleaning applications that are heat-intensive, pressurized, high-pressure, volatilized, or the like.

BACKGROUND OF THE DISCLOSURE

Hoses for conducting steam typically have corrugated, stainless steel tubing surrounded by stainless steel braiding. These types of steam hoses provide good pressure ratings and good bending abilities. The corrugated steam hoses have a maximum flow velocity, such as recommended by the National Association for Hose and Accessories Distribution (NAHAD). High velocity steam passing through the hose can cause high frequency vibrations leading to cracks in over-stressed zones. Therefore, throttling is required to operate the corrugated steam hoses within recommended velocity limitations. Class 150# flange ratings are the current pressure limit for steam service.

In contrast to corrugated steam hoses, other alternatives can be used, such as hard piping or hoses having an interlocked liner. These types of systems are heavier, more expensive, and add complications in the field. For example, a steam hose with an interlocked liner is heavy, expensive, unidirectional, and difficult to drain after hydrotesting. Elastomer hoses have limited pressure ratings and requires clamping and the like to provide couplings. Moreover, when a typical steam hose break, the loose ends can whip under the force of steam and create a safety hazard.

The subject matter of the present disclosure is directed to overcoming, or at least reducing the effects of, one or more of the problems set forth above.

SUMMARY OF THE DISCLOSURE

A system disclosed herein is used to clean inside a refinery component at a refinery using steam from a steam source. The system comprises an agent source, a junction, and at least one output hose. The agent source has a cleaning agent, and the at least one input hose is configured to deliver the steam from the steam source.

The junction is configured to mix the cleaning agent with the steam into a volatilized mixture. For example, the junction can have a first input, a second input, and an output. The first input is in communication with the agent source, and the second input is in communication with the at least one input hose. The junction mixes the agent and stem for the output.

The at least one output hose is configured to deliver the mixture from the output to inside the refinery component. The at least one output hose comprises: an external braided liner, an intermediate liner, and an internal liner. The external braided liner is composed of a first metallic braiding and has a first bore therethrough. This first brading can have one or more layers. The intermediate liner is composed of a material and defines a plurality of corrugations along a length thereof. Preferably, the intermediate liner is composed of a metallic material, but other materials can be used. The intermediate liner is positioned in the first bore and has a second bore therethrough. The internal liner is positioned in the second bore and has a third bore therethrough. The third bore is configured to communicate the volatilized mixture. Preferably, the internal liner is an internal braided liner and comprises a second metallic braiding of one or more layers, preferably of stainless steel.

Ends of the at least one output hose can each comprise one or more end fittings affixing the external, intermediate, and internal liners together. Likewise, ends of the at least one output hose can each comprise a coupling being configured to couple to another coupling. The coupling can comprise a floating flange or a hard fitting.

For the at least one output hose, a first end ring can be affixed to ends of the external braided liner and the intermediate corrugated liner and can seal a first annulus of the first bore therebetween. A second end ring can be affixed to the ends of the intermediate corrugated liner and the internal braided liner and can seal a second annulus of the second bore therebetween. These first and second end rings can be affixed concentrically together.

Depending on the required length and the implementation, the at least one output hose can comprise a plurality of the at least one output hose connected end to end to one another.

The system can further comprise at least one input hose having proximal and distal ends. The proximal end can be disposed in communication with the steam source, and the distal end can be disposed in communication with the junction. The at least one input hose can comprise a configuration of the external braided liner, the intermediate liner, and the internal braided liner comparable to the at least one output hose.

For the at least one output hose, the internal and external braided liners can comprise one or more braided layers of the respective first and second metallic braiding. The internal braided liner can comprise more braided layers than the external braided liner. The first and second metallic braiding can each comprise a stainless steel braiding. The material of the intermediate corrugated liner can comprises a stainless steel.

In the system, the internal braided liner can be configured as a whip check for the at least one output hose. Also, the internal braided liner can be configured to reduce hose separation in response to failure of the at least one output hose. Moreover, the internal braided liner can reduce a pressure drop through the third bore by as much as three times compared to the intermediate corrugated liner.

The system can further comprise one or more valves configured to selectively (i) introduce neither the steam nor the cleaning agent; (ii) introduce only the steam; or (iii) introduce the vapor mixture of the steam and the cleaning agent inside the refinery component.

In another arrangement, a system is disclosed having a hose for conveying steam at high pressure. The hose comprises: an external braided liner being composed of a first metallic braiding and having a first bore therethrough; an intermediate liner being composed of a material and defining a plurality of corrugations along a length thereof, the intermediate liner disposed in the first bore and having a second bore therethrough; and an internal braided liner being composed of a second metallic braiding, the internal braided liner disposed in the second bore and having a third bore therethrough, the third bore configured to communicate the steam.

The system can further comprise: an agent source having a cleaning agent; and a junction disposed in communication with the agent source and the at least one input hose and configured to mix the cleaning agent with the steam from the first and second input into a volatilized mixture. The system can further comprise at least one input hose configured to deliver the steam from the steam source.

As disclosed herein, a method of cleaning inside a refinery component at a refinery comprises: connecting at least one steam hose directly to a steam source of the refinery; delivering steam at high pressure from the steam source through the at least one input hose; producing a vapor mixture by mixing a cleaning agent from an agent source into the steam; and delivering the vapor mixture through at least one vapor hose to inside the vessel, wherein the at least one steam hose, the at least one vapor hose, or both comprises the hose according to the configurations disclosed above.

In the method, the cleaning agent can comprise terpene and a surfactant. In the method, delivering the steam at the high pressure from the steam source through the at least one input hose can comprise delivering the steam at least at 400-deg F. at the high pressure of at least at 300-psig from the steam source through the at least one input hose.

The foregoing summary is not intended to summarize each potential embodiment or every aspect of the present disclosure.

DETAILED DESCRIPTION OF THE DISCLOSURE

Figure 1:
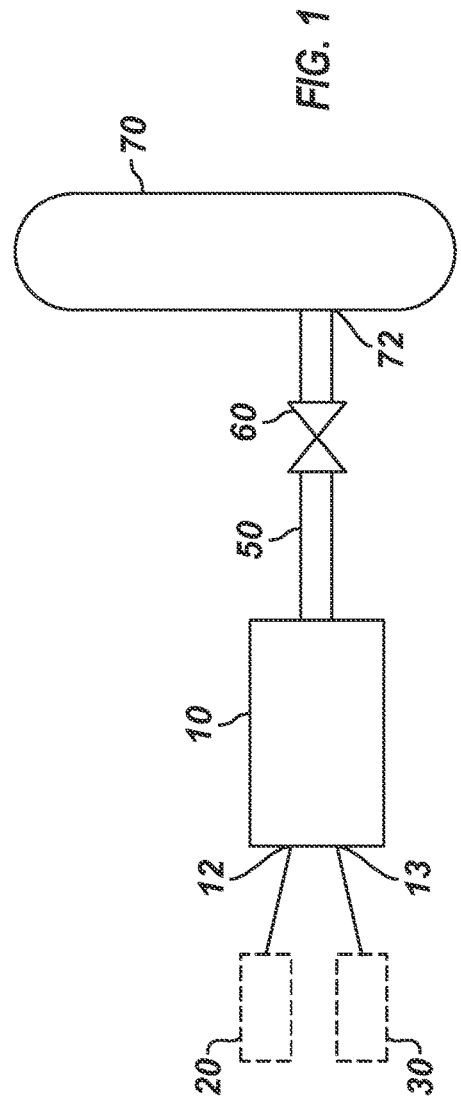
FIG. 1 illustrates a chemical cleaning operation.
Figure 2:
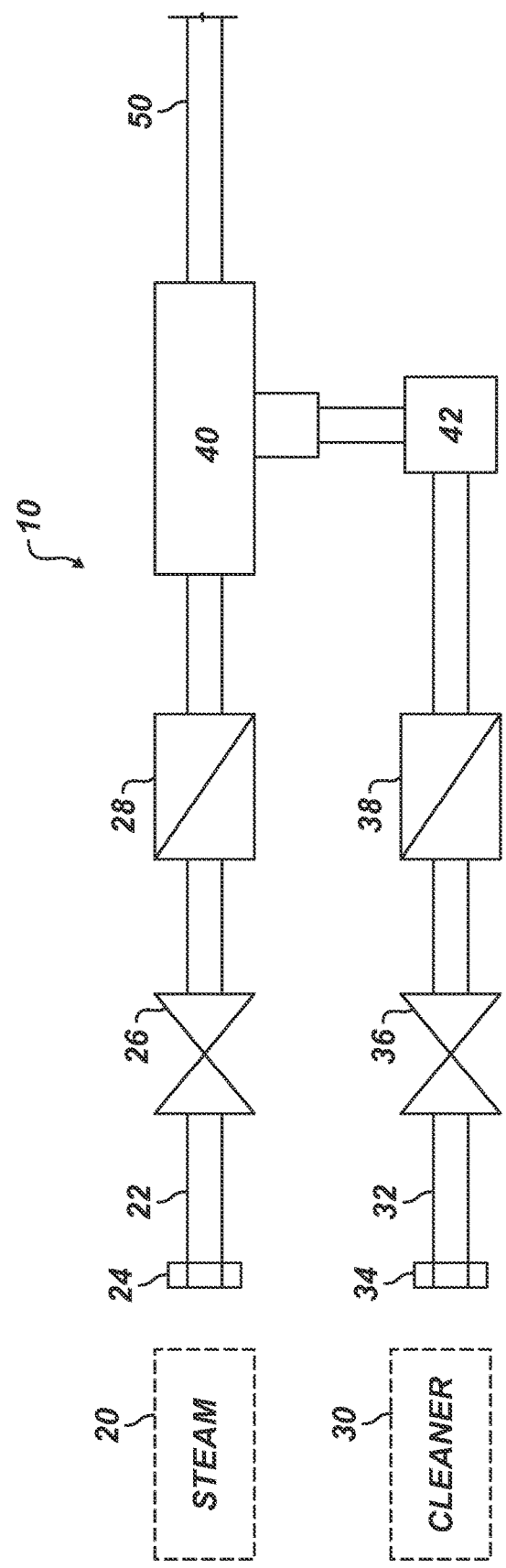
FIG. 2 illustrates an administrator for the operation connected to a steam source and a cleaning solution source.

An embodiment of the present disclosure includes an apparatus 10, such as in FIGS. 1-2, for chemical cleaning applications. In general, the chemical cleaning applications can involve operations and mixtures that are heat-intensive, pressurized, high-pressure, volatilized, or the like. For example, the apparatus 10 can be used for delivering high-temperature steam and a cleaning solution in a cleaning operation. The apparatus 10 comprises a first input 12 (e.g., 20, 24), a second input 13 (e.g., 30, 34), a junction 40, and at least one hose (e.g., 22, 32, 50). The first input 12 is configured to receive the high-temperature steam from a steam source 20, while the second input 13 is configured to receive the cleaning solution in liquid form for a cleaning solution source 30. The junction 40 mates the first and second inputs 12, 13 together, and the at least one hose (e.g., 22, 32, 50) is connected in fluid communication with the junction 40. As noted below, the at least one hose (e.g., 22, 32, 50) includes an improved lined hose 100 as shown in FIG. 3, which comprises an external liner, an intermediate conduit, and an internal liner.

The apparatus 10 can further comprise a check valve 28, 38 interposed between the first and/or second input 12, 13 and the junction 40 and configured to prevent backflow. The apparatus 10 can also comprise a gate valve 26, 36 interposed between the first and/or second input 12, 13 and the junction 40 and configured to control flow from the input to the junction 40.

Figure 3:
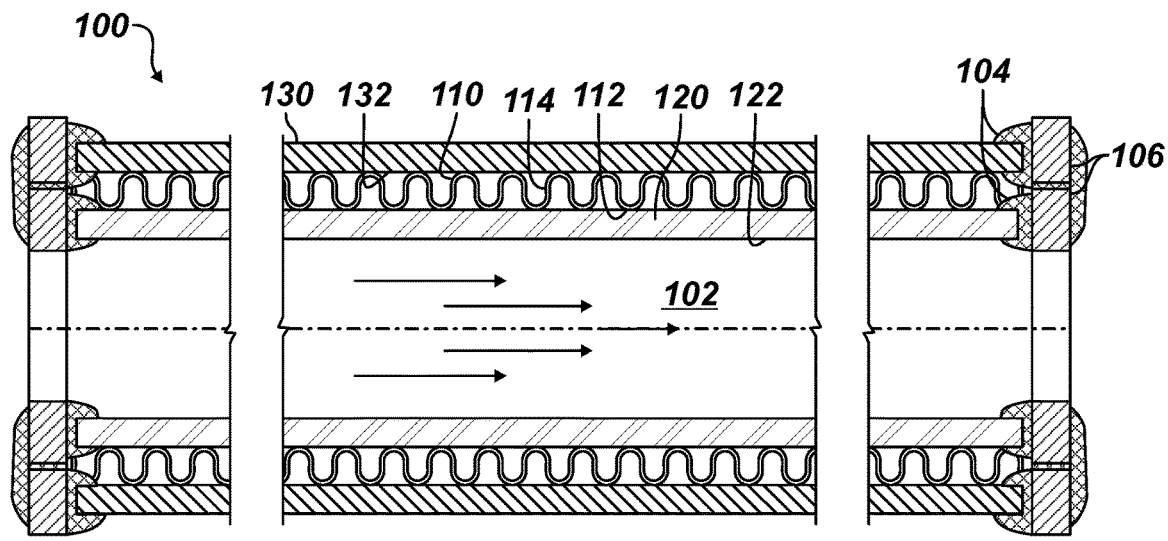
FIG. 3 illustrates a cross-section of a portion of a lined hose according to the present disclosure.

An embodiment of the present disclosure includes an improved lined hose 100, such as shown in FIG. 3, for conducting high-temperature steam combined with cleaning solution in a volatilized mixture for a cleaning operation. The hose 100 comprises an external braided liner 130; an intermediate corrugated liner, conduit, or tubing 110; and an internal braided liner 120. The external braided liner 130 comprises first braiding 132 and is disposed along a longitudinal length of the hose 100.

The intermediate conduit 110 is disposed inside the flow passage 122 of the internal liner 120 along the longitudinal length of the hose 100. The intermediate conduit 110 has a plurality of corrugations 114 disposed laterally in the tubular wall of the intermediate conduit 100. Finally, the internal braided liner 120 comprises second braiding 122 and is disposed in the flow passage 112 of the intermediate conduit 110 along the longitudinal length of the hose 100. The flow passage 122 of the internal braided liner 120 forms a full bore 102 of the hose 100 configured to conduct the high-temperature steam combined with the cleaning solution in the volatilized mixture.

A first pattern of the first braiding 132 on the external liner 130 can be the same as or different from a second pattern of the second braiding 122 on the internal liner 120. The first braiding 132 on the external liner 130 can have the same or different number of braided layers as the second braiding 122 on the internal liner 120.

Each of the external liner 130, the intermediate conduit 110, and the internal liner 120 can comprise a stainless steel material.

The hose 100 can comprise one or more welds 104 that affix each end of the external liner 130, the intermediate conduit 110, and the internal liner 120 together.

The internal liner 120 can be configured to inhibit separation of the hose 100 in response to rupture of the intermediate conduit 110, which is responsible for the pressure and temperature containment.

The internal liner 120 can comprise a girth, thickness, unit weight, or the like configured to inhibit vibrations caused by the high-temperature steam combined with the cleaning solution in the volatilized mixture being conducted through the full bore 102.

The internal liner 120 can separate the high-temperature steam combined with the cleaning solution in the volatilized mixture conducted through the full bore 102 from the plurality of corrugations 114 on the intermediate conduit 110.

Looking at FIG. 1, a chemical cleaning operation uses a combination of high-pressure steam and cleaning chemistry in a volatilized mixture designed to internally clean a component 70, such as a pressure vessel, piping, a tank, and the like at a refinery or other facility. The cleaning process may be intended to make the component 70 ready for confined space access so further inspection and cleaning steps can be performed.

One or more administrators 10 combine steam and a cleaning solution for delivery to one or more access points 72 of the component 70. Conduits 50 and valving 60 can be used to control this delivery. Depending on the component 70 to be cleaned, multiple administrators 10 may be used at different access points 72. Additionally, multiple sources of steam and cleaning solution can be used.

Some examples of vapor phase cleaning operations suitable to the present disclosure are disclosed in U.S. Pat. Nos. 6,872,263; 6,893,509; 6,936,112; 8,480,812; and 9,452,941, which are incorporated herein by reference. The cleaning solution can be a terpene, but other cleaners can be used.

As shown in FIG. 2, the administrator 10 is connected to a steam source 20 and a cleaning solution source 30. The source 20 of steam may be a pre-existing steam line in a refinery, plant, or facility. In other circumstance, the steam can be provided by other types of steam source 20, such as a mobile boiler and temporary water source. Ideally, the steam will be between 350 to 450 degrees Fahrenheit. Overall, the steam can be a medium-pressure saturated steam. A typical 150-psig refinery steam line can work effectively for the cleaning operation. However, a heated steam line of 40-psig to 250-psig delivering steam at temperatures in excess of 400 degrees Fahrenheit may be used as the steam source 20.

The steam source 20 is attached to a steam conduit or hose 22 using a connector 24. The steam conduit 22 transmits the steam under pressure to a first side of a junction 40. A steam-gate valve 26 on the conduit 22 between the steam source 20 and the junction 40 can serve to either open or shut off flow from the steam source 20. Immediately downstream of the gate valve 26, a check valve 28 can allow flow only in the downstream direction to prevent back flow of cleaning chemical or effluent into the steam source 20.

The cleaning solution is delivered from a source 30, which can include a drum or container having a pump. The cleaner source 30 can use a pneumatic barrel pump, a siphon, or other device attached to the connector 34 on the conduit 32 to draw the solution. On the conduit 32, a gate valve 36 and a check valve 38 are interposed between the cleaning solution source 30 and the junction 40. As before, the gate valve 36 is used to either allow or shut off the flow of solution from the source 30, and the check valve 38 can allow flow only in the downstream to prevent the back flow of steam into the cleaning source 30.

A standard elbow 42 can be used to converge the conduits 22 and 32 into the junction 40. After meeting up at the junction 40, the combined flow of steam and cleaning solution converge into a common conduit or hose 50 to feed the cleaning operation. As shown in FIG. 1, the common conduit 50 can be used to tap the administrator 10 into valving 60 and other access points 72 for the component 70 to be cleaned.

The valved administrator 10 enables operators to optionally: (i) introduce neither steam, nor cleaner; (ii) introduce only steam; or (iii) introduce steam and volatilized cleaning solution into a desired access point 72 of the component 70 to be cleaned. When introduced, the cleaning solution is initially in liquid form. When the liquid cleaning solution reaches the junction 40, the solution is immediately aspirated and volatilized by the steam, and the combined steam and cleaning solution in vaporous form are administered through the common conduit 50.

As noted in the background, corrugated metal hoses are typically used to transport a high-pressure steam for cleaning. There is often high differential pressure between the steam source and the component 70, which results in high internal flow velocities. Such high flow velocity can cause high frequency vibrations in the corrugated hoses.

Under such circumstances, the corrugations of the metal hoses may move—from both "inside and out" as they are all connected—leading to cracks in over-stressed zones. Neither the crests nor valleys of the corrugations are protected from this kind of stress. To avoid circumferential cracks, there are maximum recommended velocities for gas and liquid flowing through the conventional corrugated metal hose. The time required to clean can be significantly increased because throttling is required to operate within recommended velocity limitations.

According to the present disclosure, an improved hose is used to deliver the steam and cleaning solution. The improved hose is used to connect a high pressure steam source 20 and cleaning solution source 30 to low pressure component 70 (e.g., vessel, piping, etc.) while injecting cleaning chemistry in a cleaning operation. For example, the improved hose can be used particularly for the common conduit 50 that delivers the steam and volatilized cleaning solution. Other conduits 22 and 32 can use the improved hose as well. In general, the cleaning chemistry of the solution can be organic or inorganic depending on the implementation. Overall, the cleaning solution is volatilized by evaporating or dispersing in vapor in the steam. In this sense, the cleaning solution can become an atomized liquid in the mixture.

Turning now to FIGS. 3, portion of an improved hose 100 according to the present disclosure is shown in cross-section and partially exposed. The hose 100 includes an external braided liner 130 having a flow passage or bore 132 and having a braiding 134. As disclosed below, this external braided liner 130 can be composed of a metallic braiding 134, preferably made of stainless steel and having one or more braided layers for the braiding 134.

A corrugated liner, conduit, or tubing 110 is disposed in the flow passage 132 of the external liner 130 and has a plurality of corrugations 114 disposed laterally in the tubular wall of the intermediate conduit or liner 110. As disclosed below, the corrugated liner 100 can in general be composed of a metallic material, such as stainless steel. In other configurations, the corrugated liner 110 can be composed of other materials, such as rubber, nitrile, polytetrafluoroethylene (PTFE), or other such material.

An internal liner 120 is disposed inside a flow passage or bore 112 of the corrugated liner 110. This internal liner 120 also has a flow passage or bore 122. As disclosed below, this internal liner 120 is also preferably a braided liner composed of a metallic braiding 124, preferably made of stainless steel and having one or more braided layers for the braiding 124. Depending on the implementation, other forms of liners, tubing, or conduits can be used.

Each of the liners 110, 120, 130 extends the full length of the hose 100, and the flow passage 122 of the internal braided liner 120 provides a full bore 102 of the hose 100 for conveying the steam or the volatilize mixture of the steam and cleaning solution along the hose 110.

The internal braided liner 120 can have similar braiding 122 as the braiding 132 of the external braided liner 130. For example, double or triple braiding 122, 132 can be used. If desired, the external braided liner 130 may have more or less braided layers than the internal liner 120. For example, the external braided liner 130 may include two braided layers, while the internal braided liner 120 may include one braided layer. Ultimately, the type of braids, the number of braids, the layers of braids, the density of the braids, the metal fibers that make up the braids, the materials used, etc. can be the same or different for the internal and external braided liners 120, 130. In the end, the internal liner 120 preferably has a girth, thickness, unit weight, or the like to inhibit vibrations caused by the high-temperature steam combined with the cleaning solution in the volatilized mixture being conducted through the full bore 102.

As can be seen, the internal braided liner 120 does not significantly increase weight of the hose 100 and does not overly restrict the bending radius of the hose 100. Yet, in the event of a failure, the corrugated liner 110 would typically rupture, causing the external braided liner 130 to fray and possibly split. The internal braided liner 120 can act as a whip check and can reduce chances of a catastrophic hose separation should failure occur.

As diagrammed in FIG. 3, one or more mechanical welds 104 can be used at each end of the liners 110, 120, 130. The one or more welds 104 can affix one or more of the liners 110, 120, 130 to one or more end elements 106, such as end rings, end fittings, or the like, which can be welded together and affixed to other elements, such as those elements of a coupling. The welds 104 at each end of the hose 100 are preferably full penetration welds that are compliant to necessary standards to seal the interiors of the liners 110, 120, 130 (i.e., to seal the annuli between the liners 110, 120, 130. Preferably, the welding process can use a number of successive welds 104 on the different liners 110, 120, 130.

Figure 4A:
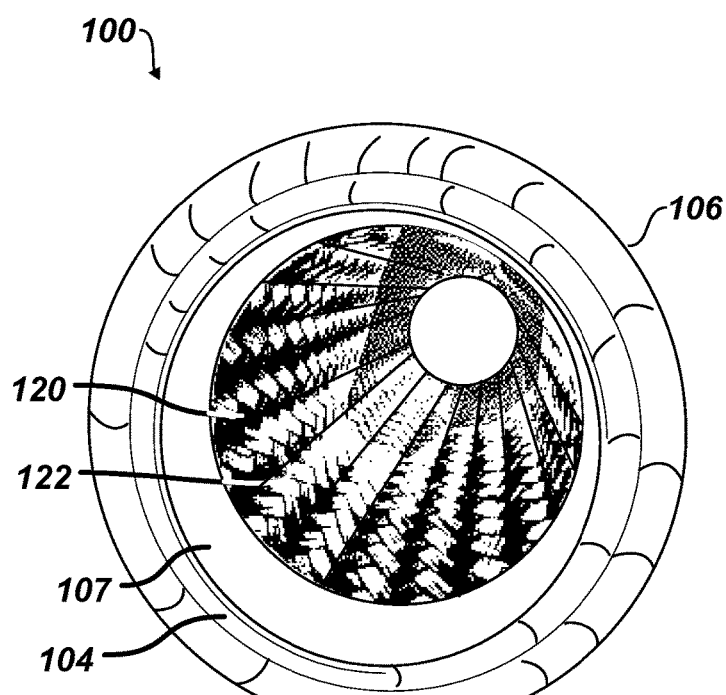
FIG. 4A show an end view of a welded end of a hose according to the present disclosure.
Figure 4B:
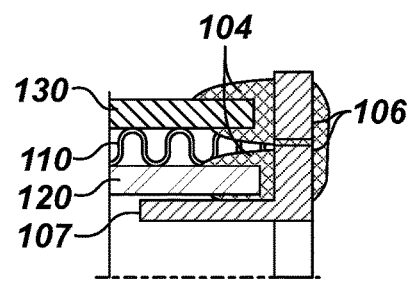
FIGS. 4B-4C illustrates cross-sections of different end fitting arrangements on the lined hose according to the present disclosure.
Figure 4C:
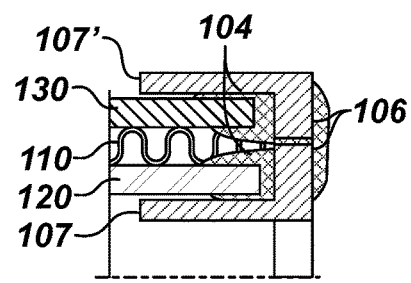

As one example, an end view of the welded end of the hose 100 according to the present disclosure is shown in FIG. 4A. The weld 104 is shown connecting the end fittings 106 together. As further shown in FIGS. 4A-4B, the inner end fitting 106 can include a cylindrical lip 107 that fits partially into the bore 122 of the internal liner 120. As likewise shown in FIG. 4C, the outer end fitting 106 can have a comparable cylindrical lip 107' that fits partially on the outside of the external liner 130. These and other modifications can be used for the mechanical affixing of the liners 110, 120, 130 together at the end of the hose 100.

Figure 5A:
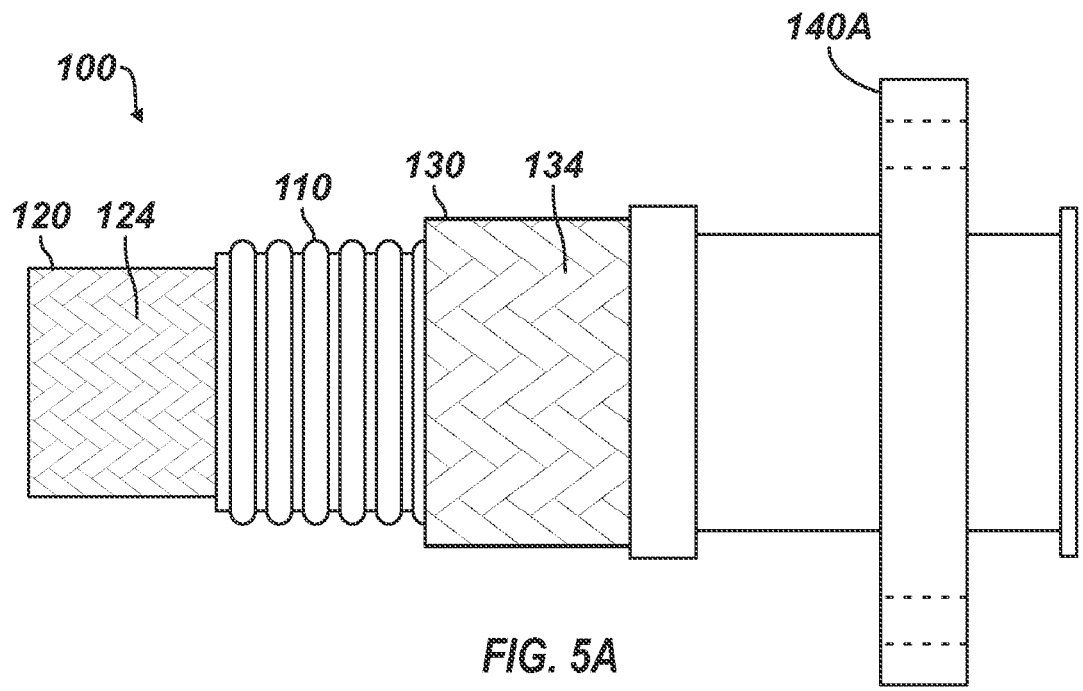
FIGS. 5A-5B illustrate partially exposed views of a portion of a lined hose according to the present disclosure.
Figure 5B:
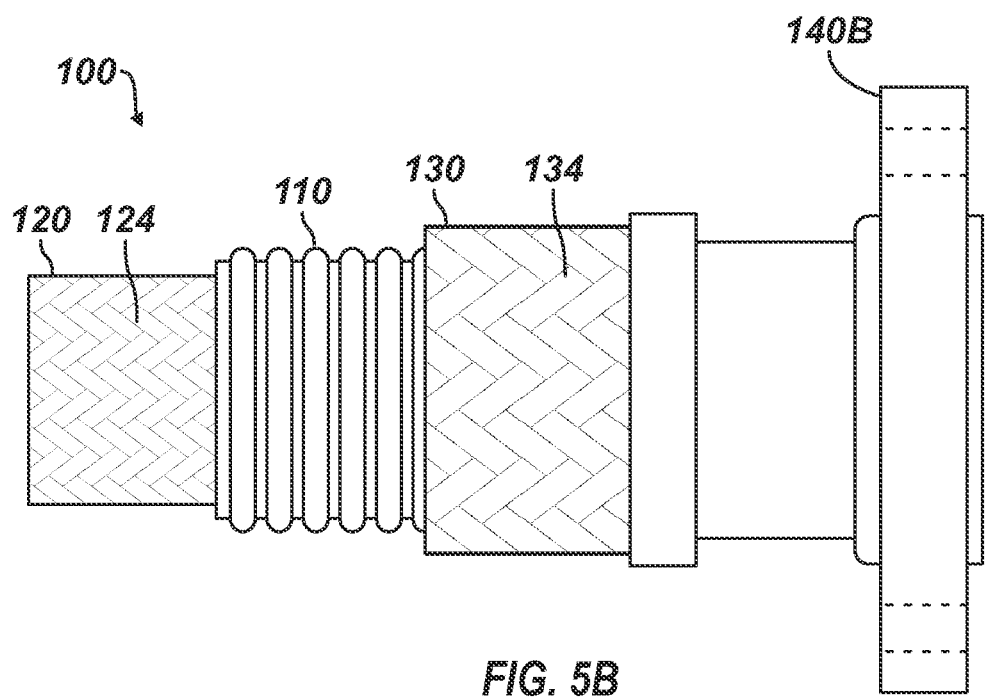

These welds 104 and end fittings 106 can be part of (or further affixed to) couplings or connectors typically used for steam hose connections. As shown in FIGS. 5A-5B, for example, flange connectors 140A-B or other type of coupling can be affixed to the ends of the hose 100 for connection to other components in the cleaning operation. For example, a class 300# floating flange as in FIG. 5A can be used, or a class 300# hard fitting as in FIG. 5B can be used to minimize field connections and excessive bending. Manufacture of the hose 100 may require compression of the braded liners 110, 120 and proper handling during welding to prevent twisting of the hose 100 and to ensure the hose 100 meets specific piping codes.

The internal braided liner 120 increases the pressure rating of the hose 100, and the internal braided liner 120 allows for higher velocity flow with the chemical solution added. As noted previously, cleaning with a conventional hose requires choking back on velocity. However, the full bore 102 of the hose 100 provided by the internal braided liner 120 can significantly reduce the pressure drop conventionally encountered with a corrugated hoses, which may have 3×-5× higher pressure drop. In fact, the full bore 102 provided by the internal braided liner 120 may reduce pressure drop over a corrugated bore by as much as 5×-10×.

The cleaning solution is added in liquid form to the high-pressure and high-temperature steam and is delivered along the hose 100. The cleaning solution introduced in liquid form into the saturated steam undergoes rapid volatilization or vaporization, which can induce vibrations and chemical effects. Adverse vibrations, typically referred to as rumblings, and damaging flow through the hose 100 may develop in the hose 100. The braided liner counteracts these effects (i.e., decreases these and other vibrations during service) by providing internal dampening of the corrugated liner 110. Chemical effects from the rapid volatilization or vaporization of the cleaning solution can potentially damage the corrugated conduit 110 so inclusion of the internal braided liner 120 can mitigate these issues. Finally, the internal braided liner 120 also helps keep the hose 100 intact during a blowout by acting as a full-length whip check for the hose 100.

The lined hose 100 of the present disclosure is designed to act more like smooth bore pipe with the addition of a full-bore stainless-steel inner braided liner 120. The smoother surface eliminates the localized vibration phenomena inside each corrugation 112 and subsequent vibration induced cracking realized encountered in a standard corrugated hose. Even with the cleaning solution, the lined hose 100 can reduce vibration induced failures and velocity limitations.

The length of the lined hose 100 can vary depending on the needs and can be 20-ft as an example. Diameters for the phase cleaning hose 100 can be from 2 to 4-in. Such a 20-ft hose of 2 to 4-in diameter may weigh from 60 to 140-lbs and may have bend radii of 5-in static to 30-in dynamic. The maximum pressure for the hose 100 at an elevated temperature of about 422-deg F. can be 295 to 480-psig, and the maximum temperature of the hose 100 at 300-psig can be between 400 to 1100-deg F. The lined hose 100 can be rated for velocities greater than 150-fps. These values are merely meant to be exemplary.

At a smaller diameter, such as ¾-in, a steam hose used in the cleaning operation may not include an internal braided liner because the corrugations of the intermediate conduit are tightly spaced creating smoother flow path.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

The invention claimed is:

1. A method of cleaning inside a refinery component at a refinery, the method comprising:
   connecting at least one input hose directly to a steam source of the refinery;
   delivering steam at high pressure of at least 300-psig from the steam source through the at least one input hose;
   producing a volatilized mixture by mixing a cleaning agent from an agent source with the steam; and
   delivering the volatilized mixture through at least one output hose to inside the refinery component,
   wherein the at least one input hose, the at least one output hose, or both comprises
      an external braided liner being composed of a first metallic braiding and having a first bore therethrough,
      an intermediate corrugated liner being composed of a material and defining a plurality of corrugations along a length thereof, the intermediate corrugated liner positioned in the first bore and having a second bore therethrough, and an internal braided liner being composed of a second metallic braiding, the internal braided liner positioned in the second bore and having a third bore therethrough, the third bore configured to deliver the volatilized mixture, and the internal braided liner being configured to inhibit vibrations caused by a high temperature of at least 400 degrees Fahrenheit of the steam combined with the cleaning agent in the volatized mixture being conducted through the third bore.

2. The method of claim 1, wherein ends of the at least one output hose each comprises one or more end fittings affixing the external braided liner, the intermediate corrugated liner, and the internal braided liner together.

3. The method of claim 1, wherein the ends of the at least one output hose each comprises a coupling being configured to couple to another coupling.

4. The method of claim 1, wherein a first end ring is affixed to ends of the external braided liner and the intermediate corrugated liner and seals a first annulus of the first bore therebetween; and wherein a second end ring is affixed to the ends of the intermediate corrugated liner and the internal braided liner and seals a second annulus of the second bore therebetween.

5. The method of claim 1, wherein the at least one output hose comprises a plurality of the at least one output hose connected end to end to one another.

6. The method of claim 1, wherein the internal and external braided liners comprise one or more braided layers of the respective first and second metallic braiding.

7. The method of claim 1, wherein the first and second metallic braiding each comprises a stainless steel braiding.

8. The system of claim 1, wherein the material of the intermediate corrugated liner comprises a stainless steel.

9. The method of claim 1, wherein the internal braided liner is configured as a whip check for the at least one output hose.

10. The method of claim 1, wherein the internal braided liner is configured to reduce hose separation in response to failure of the at least one output hose.

11. The method of claim 1, wherein the internal braided liner reduces a pressure drop through the third bore by as much as three times compared to the intermediate corrugated liner.

12. The method of claim 1, further comprising selectively (i) introduce neither the steam nor the cleaning agent; (ii) introduce only the steam; or (iii) introduce the volatilized mixture of the steam and the cleaning agent inside the refinery component.

13. The method of claim 1, wherein a junction having first and second inputs and having an output, the first input in communication with the agent source, the second input in communication with the at least one input hose, the junction configured to mix the cleaning agent and the steam from the first and second input into the volatilized mixture for the output.

14. The method of claim 1, wherein the cleaning agent comprises terpene and a surfactant.

15. The method of claim 3, wherein the coupling comprises a floating flange or a hard-fitting.

16. The method of claim 4, wherein the first and second end rings are affixed concentrically together.

17. The method of claim 6, wherein the internal braided liner comprises more braided layers than the external braided liner; or wherein the external braided liner comprises more braided layers than the internal braided liner.

* * * * *